US012592661B2

(12) United States Patent
Tani

(10) Patent No.: US 12,592,661 B2
(45) Date of Patent: Mar. 31, 2026

(54) POWER CONVERSION DEVICE

(71) Applicant: DENSO CORPORATION, Kariya-city (JP)

(72) Inventor: Keiya Tani, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 282 days.

(21) Appl. No.: 18/527,515

(22) Filed: Dec. 4, 2023

(65) Prior Publication Data

US 2024/0106367 A1 Mar. 28, 2024

Related U.S. Application Data

(63) Continuation of application No. PCT/JP2022/021327, filed on May 25, 2022.

(30) Foreign Application Priority Data

Jun. 7, 2021 (JP) ................................. 2021-095445

(51) Int. Cl.
| | |
|---|---|
| *H02J 7/00* | (2006.01) |
| *B60L 1/00* | (2006.01) |
| *B60L 15/00* | (2006.01) |
| *B60L 53/16* | (2019.01) |
| *H02J 7/06* | (2006.01) |
| *H02P 27/06* | (2006.01) |

(52) U.S. Cl.
CPC .............. *H02P 27/06* (2013.01); *B60L 1/003* (2013.01); *B60L 15/007* (2013.01); *B60L 53/16* (2019.02); *H02J 7/0013* (2013.01); *H02J 7/0042* (2013.01); *H02J 7/06* (2013.01); *H02J 2207/20* (2020.01)

(58) Field of Classification Search
CPC .......... H02M 7/42; H02M 7/48; H02M 7/487; H02M 7/493; H02M 7/501; H02M 7/4826; H02M 7/49; H02M 7/4807; H02M 7/537; H02M 7/5387; H02M 7/533; H02M 7/53; H02M 7/53871; H02M 2007/4803; H02M 2007/4822; H02M 2007/4835

See application file for complete search history.

(56) References Cited

U.S. PATENT DOCUMENTS

| | | | |
|---|---|---|---|
| 2009/0250279 A1* | 10/2009 | Holmes ................... | B60L 50/51 |
| | | | 180/65.285 |
| 2021/0351684 A1 | 11/2021 | Nishimura et al. | |
| 2022/0231619 A1 | 7/2022 | Iyasu et al. | |

FOREIGN PATENT DOCUMENTS

EP 4 159 517 A1 4/2023

* cited by examiner

*Primary Examiner* — Bryan R Perez
(74) *Attorney, Agent, or Firm* — Oliff PLC

(57) ABSTRACT

A power conversion device includes an inverter, rotating electrical machine, positive and negative electrode side main paths, neutral point path, switches provided on positive electrode side main path, negative electrode side main path and neutral point path, a first connection path that connects a first target path that is one of the positive electrode side main path, negative electrode side main path and neutral point path, and a first connection terminal of electric equipment, and a second connection path that connects a second target path that is one of the positive electrode side main path, negative electrode side main path and neutral point path other than the first target path, and a second connection terminal of the electric equipment. In the power conversion device, for example, a configuration where the first connection path is connected on electric storage device side of the switch in the first target path, is used.

9 Claims, 11 Drawing Sheets

POWER CONVERSION DEVICE

CROSS-REFERENCE TO RELATED APPLICATION

This application is the U.S. bypass application of International Application No. PCT/JP2022/021327 filed on May 25, 2022, which designated the U.S. and claims priority to Japanese Patent Application No. 2021-095445 filed on Jun. 7, 2021, the contents of all of which are incorporated herein by reference.

TECHNICAL FIELD

The present disclosure relates to a power conversion device including an electric storage device including a first electric storage unit and a second electric storage unit connected in series on a negative electrode side of the first electric storage unit, an inverter including upper and lower arm switches, and a rotating electrical machine including a winding wire connected to the inverter.

BACKGROUND

As this type of device, as disclosed in JP 2020-120566 A, a device including a positive electrode side main path, a negative electrode side main path, a neutral point path, and a neutral point switch provided on the neutral point path is known. The positive electrode side main path connects a high-potential side terminal of the upper arm switch and a positive electrode side of the first electric storage unit. The negative electrode side main path connects a low-potential side terminal of the lower arm switch and a negative electrode side of the second electric storage unit. The neutral point path connects a battery connection point of a negative electrode side of the first electric storage unit and a positive electrode side of the second electric storage unit, and a neutral point of the winding wire.

SUMMARY

The present disclosure provides a power conversion device including:

an electric storage device including a first electric storage unit and a second electric storage unit connected in series on a negative electrode side of the first electric storage unit;

an inverter including upper and lower arm switches;

a rotating electrical machine including a winding wire connected to the inverter;

a positive electrode side main path that connects a high-potential side terminal of the upper arm switch and a positive electrode side of the first electric storage unit;

a negative electrode side main path that connects a low-potential side terminal of the lower arm switch and a negative electrode side of the second electric storage unit;

a neutral point path that connects a battery connection point of a negative electrode side of the first electric storage unit and a positive electrode side of the second electric storage unit, and a neutral point of the winding wire;

switches provided on the positive electrode side main path, the negative electrode side main path and the neutral point path;

electric equipment including a first connection terminal and a second connection terminal;

a first connection path that connects a first target path that is one of the positive electrode side main path, the negative electrode side main path and the neutral point path, and the first connection terminal; and a second connection path that connects a second target path that is one of the positive electrode side main path, the negative electrode side main path and the neutral point path, other than the first target path, and the second connection terminal, in which at least one of a configuration where the first connection path is connected on the electric storage device side of the switch among the first target path or a configuration where the second connection path is connected on the electric storage device side of the switch in the second target path, is used.

BRIEF DESCRIPTION OF THE DRAWINGS

The above features of the present disclosure will be made clearer by the following detailed description, given referring to the appended drawings. In the accompanying drawings:

FIG. 3 is a flowchart of processing to be executed by a control device according to a modification of the first embodiment;

FIG. 4 is a configuration diagram of a power conversion device according to a second embodiment;

FIG. 10 is a configuration diagram of a power conversion device according to an eighth embodiment;

FIG. 11 is a configuration diagram of a power conversion device according to a ninth embodiment; and FIG. 12 is a configuration diagram of a power conversion device according to a tenth embodiment.

DETAILED DESCRIPTION OF THE PREFERRED EMBODIMENTS

Figure 1:
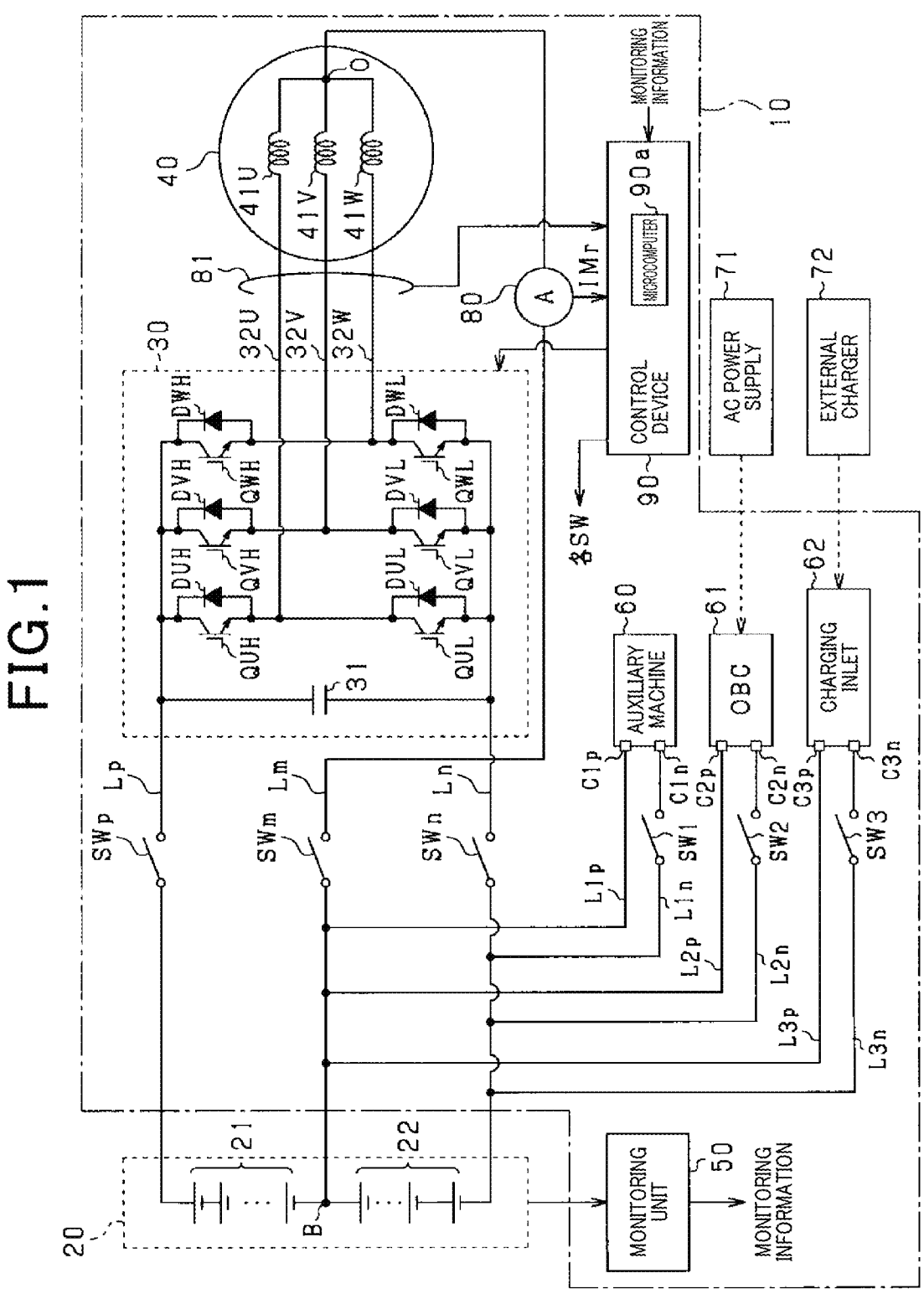
FIG. 1 is a configuration diagram of a power conversion device according to a first embodiment.

In the power conversion device disclosed in JP 2020-120566 A, a device including a positive electrode side main path, a negative electrode side main path, a n, in a state where the neutral point switch is turned on, current flows between the first electric storage unit and the second electric storage unit via the neutral point path, the neutral point of the winding wire and the inverter by switching control of the upper and lower arm switches that constitute the inverter. By this means, for example, a voltage of the first electric storage unit and a voltage of the second electric storage unit are equalized, and temperatures of the first electric storage unit and the second electric storage unit are increased.

There is a case where electric equipment connected to any two of a neutral point path, a positive electrode side main path and a negative electrode side main path is provided. Power is transmitted between the electric equipment and an electric storage device.

Here, in a case where power is transmitted between the electric equipment and the electric storage device, there is a case where current flows between a first electric storage unit and a second electric storage unit that constitute the electric storage device as a result of switching control of the upper and lower arm switches being performed. In this case, combined current of current flowing between the electric equipment and the electric storage device and current flowing in association with execution of switching control flows through the switch, and thus, it is required to increase current capacity of the switch. However, in this case, a size of the switch becomes large, or the cost of the switch increases.

The present disclosure is mainly directed to providing a power conversion device capable of reducing the current capacity of a switch.

The present disclosure provides a power conversion device including:

an electric storage device including a first electric storage unit and a second electric storage unit connected in series on a negative electrode side of the first electric storage unit;

an inverter including upper and lower arm switches;

a rotating electrical machine including a winding wire connected to the inverter;

a positive electrode side main path that connects a high-potential side terminal of the upper arm switch and a positive electrode side of the first electric storage unit;

a negative electrode side main path that connects a low-potential side terminal of the lower arm switch and a negative electrode side of the second electric storage unit;

a neutral point path that connects a battery connection point of a negative electrode side of the first electric storage unit and a positive electrode side of the second electric storage unit, and a neutral point of the winding wire;

switches provided on the positive electrode side main path, the negative electrode side main path and the neutral point path;

electric equipment including a first connection terminal and a second connection terminal;

a first connection path that connects a first target path that is one of the positive electrode side main path, the negative electrode side main path and the neutral point path, and the first connection terminal; and a second connection path that connects a second target path that is one of the positive electrode side main path, the negative electrode side main path and the neutral point path, other than the first target path, and the second connection terminal, in which at least one of a configuration where the first connection path is connected on the electric storage device side of the switch among the first target path or a configuration where the second connection path is connected on the electric storage device side of the switch in the second target path, is used.

In a case where the configuration where the first connection path is connected on the electric storage device side of the switch in the first target path is used, the electric storage device is electrically connected to the electric equipment without interposition of the switch provided on the first target path. It is therefore possible to reduce current capacity of the switch provided on the first target path.

Further, in a case where the configuration where the second connection path is connected on the electric storage device side of the switch in the second target path is used, the electric storage device is electrically connected to the electric equipment without interposition of the switch provided on the second target path. It is therefore possible to reduce current capacity of the switch provided on the second target path.

First Embodiment

A first embodiment that is an embodiment of a power conversion device according to the present disclosure will be described below with reference to the drawings. The power conversion device of the present embodiment is mounted on a vehicle such as an electric vehicle or a hybrid vehicle.

As illustrated in FIG. 1, a power conversion device 10 includes an inverter 30 and rotating electrical machine 40. The rotating electrical machine 40, which is three-phase synchronous machine, includes U-phase, V-phase, and W-phase winding wires 41U, 41V and 41W that are star-connected. The respective winding wires 41U, 41V and 41W are arranged while being displaced by an electric angle of 120° each. The rotating electrical machine 40 is, for example, permanent magnet synchronous machine. In the present embodiment, the rotating electrical machine 40 is a main engine mounted on a vehicle and serves as a driving power source for the vehicle.

The inverter 30 includes serial connection bodies of upper arm switches QUH, QVH and QWH and lower arm switches QUL, QVL and QWL corresponding to three phases. In the present embodiment, as the respective switches QUH, QVH, QWH, QUL, QVL and QWL, voltage control type semiconductor switching elements are used, and specifically, IGBTs are used. Thus, high-potential side terminals of the respective switches QUH, QVH, QWH, QUL, QVL and QWL are collectors, and low-potential side terminals are emitters. Diodes DUH, DVH, DWH, DUL, DVL and DWL that are free wheel diodes are connected in inverse-parallel to the respective switches QUH, QVH, QWH, QUL, QVL and QWL.

A first end of the U-phase winding wire 41U is connected to the emitter of the U-phase upper arm switch QUIET and the collector of the U-phase lower arm switch QUL via a U-phase conductive member 32U. A first end of the V-phase winding wire 41V is connected to the emitter of the V-phase upper arm switch QVH and the collector of the V-phase lower arm switch QVL via a V-phase conductive member 32V. A first end of the W-phase winding wire 41W is connected to the emitter of the W-phase upper arm switch QWH and the collector of the W-phase lower arm switch QWL via a W-phase conductive member 32W. Second terminals of the U-phase, V-phase and W-phase winding wires 41U, 41V and 41W are connected to each other at a neutral point O. Note that the respective conductive members 32U to 32W are, for example, bas bars or cables. Further, in the present embodiment, the same number of turns is set at the respective winding wires 41U, 41V and 41W. By this means, for example, the same inductance is set for the respective winding wires 41U, 41V and 41W.

The collectors of the respective upper arm switches QUH, QVH and QWH are connected to a positive electrode terminal of an assembled battery 20 with a positive electrode side main path Lp. The emitters of the respective lower arm switches QUL, QVL and QWL are connected to a negative electrode terminal of the assembled battery 20 with a negative electrode side main path Ln. Note that in the present embodiment, the negative electrode side main path Ln corresponds to a "second target path".

The power conversion device 10 includes a capacitor 31. The capacitor 31 connects the collectors of the respective upper arm switches QUH, QVH and QWH and the emitters of the respective lower arm switches QUL, QVL and QWL. Note that the capacitor 31 may be built into the inverter 30 or may be provided outside the inverter 30.

The assembled battery 20, which corresponds to an "electric storage device", is constituted as a serial connection body of battery cells that are single batteries. In the present embodiment, the same terminal voltage (for example, a rated voltage) is set for the respective battery cells constituting the assembled battery 20. As the battery cell, for example, a secondary battery such as a lithium-ion battery can be used. Note that the assembled battery 20 is, for example, provided outside the power conversion device 10.

In the present embodiment, a serial connection body of a plurality of battery cells on a high-potential side among the battery cells that constitute the assembled battery 20 constitutes a first storage battery 21 (corresponding to a "first electric storage unit"), and a serial connection body of a plurality of battery cells on a low-potential side constitute a second storage battery 22 (corresponding to a "second electric storage unit"). In other words, the assembled battery 20 is divided into two blocks. In the present embodiment, the number of battery cells that constitute the first storage battery 21 is the same as the number of battery cells that constitute the second storage battery 22. Thus, a terminal voltage (for example, a rated voltage) of the first storage battery 21 is the same as a terminal voltage (for example, a rated voltage) of the second storage battery 22. In the present embodiment, the rated voltages of the first storage battery 21 and the second storage battery 22 are set at 400 V. Thus, the rated voltage of the assembled battery 20 is set at 800 V. In the assembled battery 20, an intermediate terminal B (corresponding to a "battery connection point") is connected to a negative electrode terminal of the first storage battery 21 and a positive electrode terminal of the second storage battery 22.

The power conversion device 10 includes a monitoring unit 50. The monitoring unit 50 monitors terminal voltages, SOCs, SOHs, temperatures, and the like, of the respective battery cells that constitute the assembled battery 20. Monitoring information of the monitoring unit 50 is input to a control device 90 provided at the power conversion device 10.

The power conversion device 10 includes a neutral point path Lm and a neutral point switch SWm. The neutral point path Lm electrically connects the intermediate terminal B of the assembled battery 20 and the neutral point O. The neutral point switch SWm is provided on the neutral point path Lm. In the present embodiment, the neutral point switch SWm is a relay. By the neutral point switch SWm being turned on, the intermediate terminal B is electrically connected to the neutral point O. On the other hand, by the neutral point switch SWm being turned off, the intermediate terminal B is electrically disconnected from the neural point O. Note that in the present embodiment, the neutral point path Lm corresponds to a "first target path".

The power conversion device 10 includes a positive electrode side switch SWp and a negative electrode side switch SWn. In the present embodiment, the positive electrode side switch SWp and the negative electrode side switch SWn are relays.

The positive electrode side switch SWp is provided on the positive electrode side main path Lp. By the positive electrode side switch SWp being turned on, the positive electrode terminal of the first storage battery 21 is electrically connected to the collectors of the respective upper arm switches QUH, QVH and QWH. On the other hand, by the positive electrode side switch SWp being turned off, the positive electrode terminal of the first storage battery 21 is electrically disconnected from the collectors of the respective upper arm switches QUH, QVH and QWH.

The negative electrode side switch SWn is provided on the negative electrode side main path Ln. By the negative electrode side switch SWn being turned on, the negative electrode terminal of the second storage battery 22 is electrically connected to the emitters of the lower arm switches QUL, QVL and QWL. On the other hand, by the negative electrode side switch SWn being turned off, the negative electrode terminal of the second storage battery 22 is electrically disconnected from the emitters of the lower arm switches QUL, QVL and QWL.

The power conversion device 10 includes auxiliary machine 60, a charger 61 and a charging inlet 62 as electric equipment. Further, the power conversion device 10 includes a first high-potential side path L1p, a first low-potential side path L1n, a first cutoff switch SW1, a second high-potential side path L2p, a second low-potential side path L2n, a second cutoff switch SW2, a third high-potential side path L3p, a third low-potential side path L3n and a third cutoff switch SW3 as components for electrically connecting the electric equipment to the assembled battery 20. In the present embodiment, the cutoff switches SW1 to SW3 are relays.

The auxiliary machine 60 includes a first positive electrode side terminal C1p and a first negative electrode side terminal C1n. A first end of the first high-potential side path L1p is connected to the first positive electrode side terminal C1p. A portion on the intermediate terminal B side from the neutral point switch SWm in the neutral point path Lm is connected to a second end of the first high-potential side path L1p. A first end of the first low-potential side path L1n is connected to the first negative electrode side terminal C1n. A portion on the second storage battery 22 side from the negative electrode side switch SWn in the negative electrode side main path Ln is connected to a second end of the first low-potential side path L1n. The first cutoff switch SW1 is provided on the first low-potential side path L1n. In a state where the first cutoff switch SW1 is turned on, power can be supplied from the second storage battery 22 to the auxiliary machine 60.

The auxiliary machine 60 includes a DC-DC converter, an air conditioning inverter, and an air conditioning heater. The DC-DC converter is driven for stepping down an output voltage of the second storage battery 22 and supplying the voltage to a low-voltage storage battery (not illustrated). The low-voltage storage battery is, for example, a lead storage battery having a rated voltage of 12 V. The air conditioning inverter drives an electric compressor that circulates a refrigerant within a refrigeration cycle. The air conditioning heater is driven for heating a vehicle interior.

The charger 61 includes a second positive electrode side terminal C2p and a second negative electrode side terminal C2n. A first end of the second high-potential side path L2p is connected to the second positive electrode side terminal C2p. A portion on the intermediate terminal B side from the neutral point switch SWm in the neutral point path Lm is connected to a second end of the second high-potential side path L2p. A first end of the second low-potential side path L2n is connected to the second negative electrode side terminal C2n. A portion on the second storage battery 22 side from the negative electrode side switch SWn in the negative electrode side main path Ln is connected to a second end of the second low-potential side path L2n.

A charging connector connected to an AC power supply 71 provided in a house, or the like, is connectable to the charger 61. The charging connector is connected to the charger 61 by a user, for example. In a state where the charging connector is connected to the charger 61 and the second cutoff switch SW2 is turned on, the charger 61 converts an AC voltage output from the AC power supply 71 into an DC voltage and supplies the DC voltage to the second storage battery 22. Note that the charger 61 is also referred to as an on-board charger (OBC). On the other hand, by the second cutoff switch SW2 being turned off, safety of the user is secured.

The charging inlet 62 includes a third positive electrode side terminal C3p and a third negative electrode side terminal C3n. A first end of the third high-potential side path L3p is connected to the third positive electrode side terminal C3p. A portion on the intermediate terminal B side from the neutral point switch SWm in the neutral point path Lm is connected to a second end of the third high-potential side path L3p. A first end of the third low-potential side path L3n is connected to the third negative electrode side terminal C3n. A portion on the second storage battery 22 side from the negative electrode side switch SWn in the negative electrode side main path Ln is connected to a second end of the third low-potential side path L3n.

A charging connector connected to an external charger 72 (corresponding to a "charging facility") provided outside the vehicle is connectable to the charging inlet 62. The charging connector is connected to the charging inlet 62 by the user, for example. The external charger 72 converts an AC voltage (for example, a single-phase or three-phase AC voltage) supplied from a system power supply into a DC voltage. In a state where the charging connector is connected to the charging inlet 62 and the third cutoff switch SW3 is turned on, charging current is supplied from the external charger 72 to the second storage battery 22 via the charging inlet 62. On the other hand, by the third cutoff switch SW3 being turned off, safety of the user is secured.

Note that in the present embodiment, the first to the third positive electrode side terminals C1p to C3p correspond to a "first connection terminal", and the first to the third negative electrode side terminals C1n to C3n correspond to a "second connection terminal". Further, the first to the third high-potential side paths L1p to L3p correspond to a "first connection path", and the first to the third low-potential side paths L1n to L3n correspond to a "second connection path".

The power conversion device 10 includes a current sensor 80 and a phase current sensor 81. The current sensor 80 detects current flowing through the neutral point path Lm. The phase current sensor 81 detects phase current corresponding to at least two phases. The phase current sensor 81, for example, detects current flowing through the conductive members corresponding to at least two phases among the conductive members 32U to 32W. Detection values of the respective current sensors 80 and 81 are input to the control device 90.

The control device 90 is mainly constituted with a microcomputer 90a, and the microcomputer 90a includes a CPU. Functions to be provided by the microcomputer 90a can be provided by software recorded in a tangible memory device, a computer that executes the software, only software, only hardware or a combination thereof. For example, in a case where the microcomputer 90a is provided by an electronic circuit that is hardware, the microcomputer 90a can be provided by a digital circuit including a number of logic circuits or an analog circuit. For example, the microcomputer 90a executes a program stored in a non-transitory tangible storage medium that is a storage unit provided at the microcomputer 90a. The program includes, for example, programs of voltage equalization control, temperature rise control and control indicated in FIG. 2 and FIG. 3 which will be described later. By the program being executed, a method corresponding to the program is executed. The storage unit is, for example, a non-volatile memory. Note that the program stored in the storage unit can be, for example, updated via a communication network such as the Internet.

The control device 90 performs switching control of the respective switches QUIET to QWL constituting the inverter 30 on the basis of detection values, and the like, of the phase current sensor 81 to perform feedback control of a control amount of the rotating electrical machine 40 to a command value. In the present embodiment, the control amount is torque. In each phase, the upper arm switch and the lower arm switch are alternately turned on.

The control device 90 can turn on or off the neutral point switch SWm, the positive electrode side switch SWp, the negative electrode side switch SWn and the first to the third cutoff switches SW1 to SW3 and can perform communication with the monitoring unit 50.

The control device 90 functions as a "control unit" that performs temperature rise control and voltage equalization control in a state where the neutral point switch SWm, the positive electrode side switch SWp and the negative electrode side switch SWn are turned on. The temperature rise control is switching control of the inverter 30 for applying AC current between the first storage battery 21 and the second storage battery 22 via the neutral point path Lm, the neutral point O and the inverter 30. A temperature of the assembled battery 20 is increased by this control. The voltage equalization control is switching control of the inverter 30 for applying DC current from one of the first storage battery 21 and the second storage battery 22 to the other via the neutral point path Lm, the neutral point O and the inverter 30. Energy is supplied from one of the first storage battery 21 and the second storage battery 22 to the other by this control, and voltages of the first storage battery 21 and the second storage battery 22 are equalized.

The control device 90 calculates neutral point command current for temperature rise control or voltage equalization control. The neutral point command current for temperature rise control is an AC component, and the neutral point command current for voltage equalization control is a DC component. The control device 90 performs switching control of the inverter 30 to control the current detected by the current sensor 80 to be the neutral point command current. Note that the control device 90 can perform the temperature rise control and the voltage equalization control at the same time. In this case, the neutral point command current becomes a total value of the AC component and the DC component. Further, in a case where the control device 90 controls the control amount of the rotating electrical machine 40 for causing the vehicle to travel without performing temperature rise control or voltage equalization control, the control device 90 turns on the positive electrode side switch SWp and the negative electrode side switch SWn and turns off the neutral point switch SWm.

Figure 2:
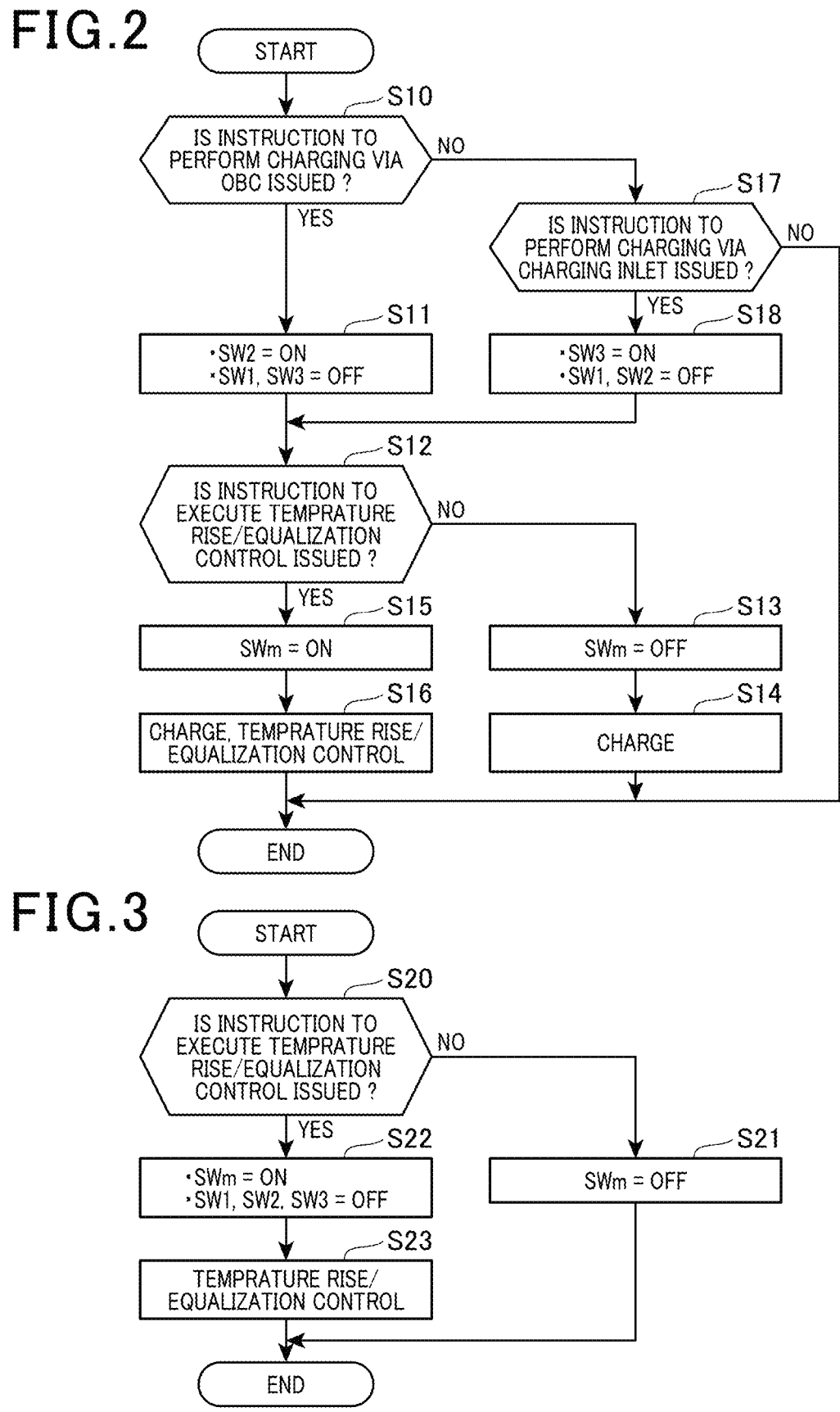
FIG. 2 is a flowchart of processing to be executed by a control device.

FIG. 2 indicates a flowchart of processing to be performed by the control device 90. Note that it is assumed in the example indicated in FIG. 2 that the vehicle is stopped, and the positive electrode side switch SWp and the negative electrode side switch SWn are turned on.

In step S10, it is determined whether an instruction to charge the second storage battery 22 via the charger 61 is issued. For example, in a case where it is determined that the charging connector of the AC power supply 71 is connected to the charger 61, it may be determined that the charging instruction is issued.

In a case where it is determined in step S10 that the charging instruction is issued, the processing proceeds to step S11, and the second cutoff switch SW2 is turned on, and the first cutoff switch SW1 and the third cutoff switch SW3 are turned off.

In subsequent step S12, it is determined whether an instruction to execute at least one of temperature rise control or voltage equalization control is issued.

In a case where it is determined in step S12 that the instruction to execute temperature rise control or voltage equalization control is not issued, the processing proceeds to step S13, and the neutral point switch SWm is turned off. Then, in step S14, the second storage battery 22 is charged by controlling the charger 61.

On the other hand, in a case where it is determined in step S12 that the instruction to execute at least one of temperature rise control or voltage equalization control is issued, the processing proceeds to step S15, and the neutral point switch SWm is turned on. Then, in step S16, the second storage battery 22 is charged by controlling the charger 61. Further, temperature rise control or voltage equalization control for which the execution instruction is issued is executed.

Current flows through the neutral point switch SWm, the positive electrode side switch SWp and the negative electrode side switch SWn in association with execution of at least one of temperature rise control or voltage equalization control. On the other hand, a large portion of charging current supplied from the charger 61 flows through the second storage battery 22, and little charging current supplied from the charger 61 flows through the neutral point switch SWm and the negative electrode side switch SWn. This is because the second high-potential side path L2p is connected to a portion on the intermediate terminal B side from the neutral point switch SWm in the neutral point path Lm, and the second low-potential side path L2n is connected to a portion on the second storage battery 22 side from the negative electrode side switch SWn in the negative electrode side main path Ln. By this means, current capacity of the neutral point switch SWm and the negative electrode side switch SWn can be made smaller.

A surge voltage is generated in association with execution of switching control of at least one of temperature rise control or voltage equalization control. In the present embodiment, in a case where this switching control is performed, the first cutoff switch SW1 and the third cutoff switch SW3 are turned off. It is therefore possible to prevent the surge voltage from transmitting to the auxiliary machine 60 and the charging inlet 62. This can prevent a failure of the auxiliary machine 60 and the charging inlet 62.

In a case where it is determined in step S10 that the charging instruction is not issued, the processing proceeds to step S17, and it is determined whether an instruction to charge the second storage battery 22 via the charging inlet 62 is issued. For example, in a case where it is determined that the charging connector of the external charger 72 is connected to the charging inlet 62, it may be determined that the charging instruction is issued.

In a case where it is determined in step S17 that the charging instruction is issued, the processing proceeds to step S18, and the third cutoff switch SW3 is turned on, and the first cutoff switch SW1 and the second cutoff switch SW2 are turned off. Thereafter, the processing proceeds to step S12, and in a case where a positive determination result is obtained in step S12, processing in step S15 and S16 is executed. While the second storage battery 22 is charged with power supplied from the charger 61 or the charging inlet 62, voltage equalization control in which power is supplied from the second storage battery 22 to the first storage battery 21 is performed. By this means, the first storage battery 21 and the second storage battery 22 can be charged even in a case where only the second storage battery 22 out of the first storage battery 21 and the second storage battery 22 is a charging target by the external charging facility.

A large portion of the charging current supplied from the charging inlet 62 flows through the second storage battery 22, and charging current supplied from the charging inlet 62 does not flow through the neutral point switch SWm and the negative electrode side switch SWn or little charging current flows through the neutral point switch SWm and the negative electrode side switch SWn. By this means, current capacity of the neutral point switch SWm and the negative electrode side switch SWn can be made smaller. For example, the current capacity of the neutral point switch SWm and the negative electrode side switch SWn can be made smaller than a total value of a maximum value of current flowing through the neutral point path Lm and the negative electrode side main path Ln in a case where one of temperature rise control and voltage equalization control or both of temperature rise control and voltage equalization control is performed, and a maximum value of the charging current supplied to the second storage battery 22 from the charger 61 or the charging inlet 62.

For comparison, for example, while the vehicle is traveling, there is also a case where the control amount of the rotating electrical machine 40 is controlled while power is supplied from the second storage battery 22 and the auxiliary machine 60 is driven. In this case, combined current of current flowing from the second storage battery 22 to the auxiliary machine 60 and current for controlling the control amount flows through the negative electrode side main path Ln. However, with the above-described arrangement of the negative electrode side switch SWn, the current capacity of the negative electrode side switch SWn can be made smaller.

Modification of First Embodiment

The control device 90 may perform processing indicated in FIG. 3 in place of the processing indicated in FIG. 2. Note that it is assumed in the example indicated in FIG. 3 that the positive electrode side switch SWp and the negative electrode side switch SWn are turned on.

In step S20, it is determined whether an instruction to execute at least one of temperature rise control or voltage equalization control is issued.

In a case where it is determined in step S21 that an instruction to execute temperature rise control or voltage equalization control is not issued, the processing proceeds to step S21, and the neutral point switch SWm is turned off. Note that in this case, it is only necessary to turn on the first cutoff switch SW1 in a case where the auxiliary machine 60 is driven. Further, in a case where it is determined that an instruction to perform charging via the charger 61 or the charging inlet 62 is issued, it is only necessary to turn on the second cutoff switch SW2 or the third cutoff switch SW3.

On the other hand, in a case where it is determined in step S20 that an instruction to execute at least one of temperature rise control or voltage equalization control is issued, the processing proceeds to step S22, and the neutral point switch SWm is turned on. Further, the first to the third cutoff switches SW1 to SW3 are turned off. Then, the processing proceeds to step S23, and temperature rise control or voltage equalization control for which an execution instruction is issued is executed. The first to the third cutoff switches SW1 to SW3 are turned off, so that it is possible to prevent a surge voltage generated in association with execution of this control from transmitting to the auxiliary machine 60, the charger 61 and the charging inlet 62. This can prevent a failure of the auxiliary machine 60, the charger 61 and the charging inlet 62. For comparison, in step S22, one or two cutoff switches among the first to the third cutoff switches SW1 to SW3 may be turned off.

Second Embodiment

Figure 4:
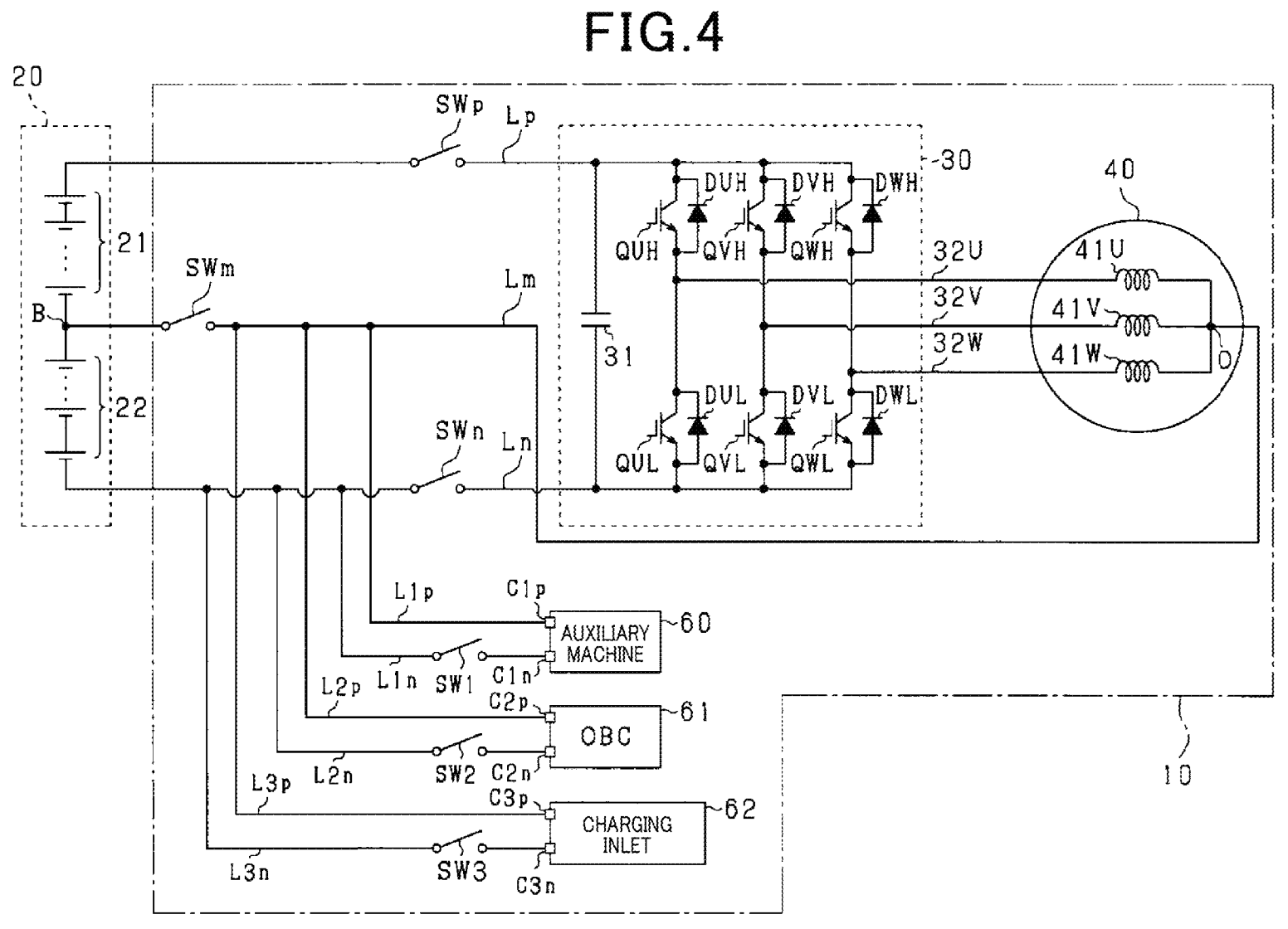

A second embodiment will be described below with reference to the drawings mainly concerning a difference from the first embodiment. In the present embodiment, as illustrated in FIG. 4, the neutral point switch SWm is provided at a portion on the intermediate terminal B side from a connection point of the high-potential side paths L1$p$, L2$p$ and L3$p$ in the neutral point path Lm. Note that among components described in the following embodiments, the same reference numerals will be assigned to components that are the same as or correspond to the components illustrated in FIG. 1 above for convenience sake. Further, in the drawings corresponding to the following embodiments, illustration of part of the components illustrated in FIG. 1 above will be omitted.

Among processing to be executed by the control device 90 of the present embodiment, a difference from the processing indicated in FIG. 2 will be described.

In step S11, in addition to the second cutoff switch SW2, the neutral point switch SWm is turned on.

In a case where a positive determination result is obtained in step S12, the processing proceeds to step S16, and in a case where a negative determination result is obtained in step S12, the processing proceeds to step S14.

In step S17, in addition to the third cutoff switch SW3, the neutral point switch SWm is turned on.

According to the present embodiment described above, the current capacity of the negative electrode switch SWn can be reduced.

Third Embodiment

Figure 5:
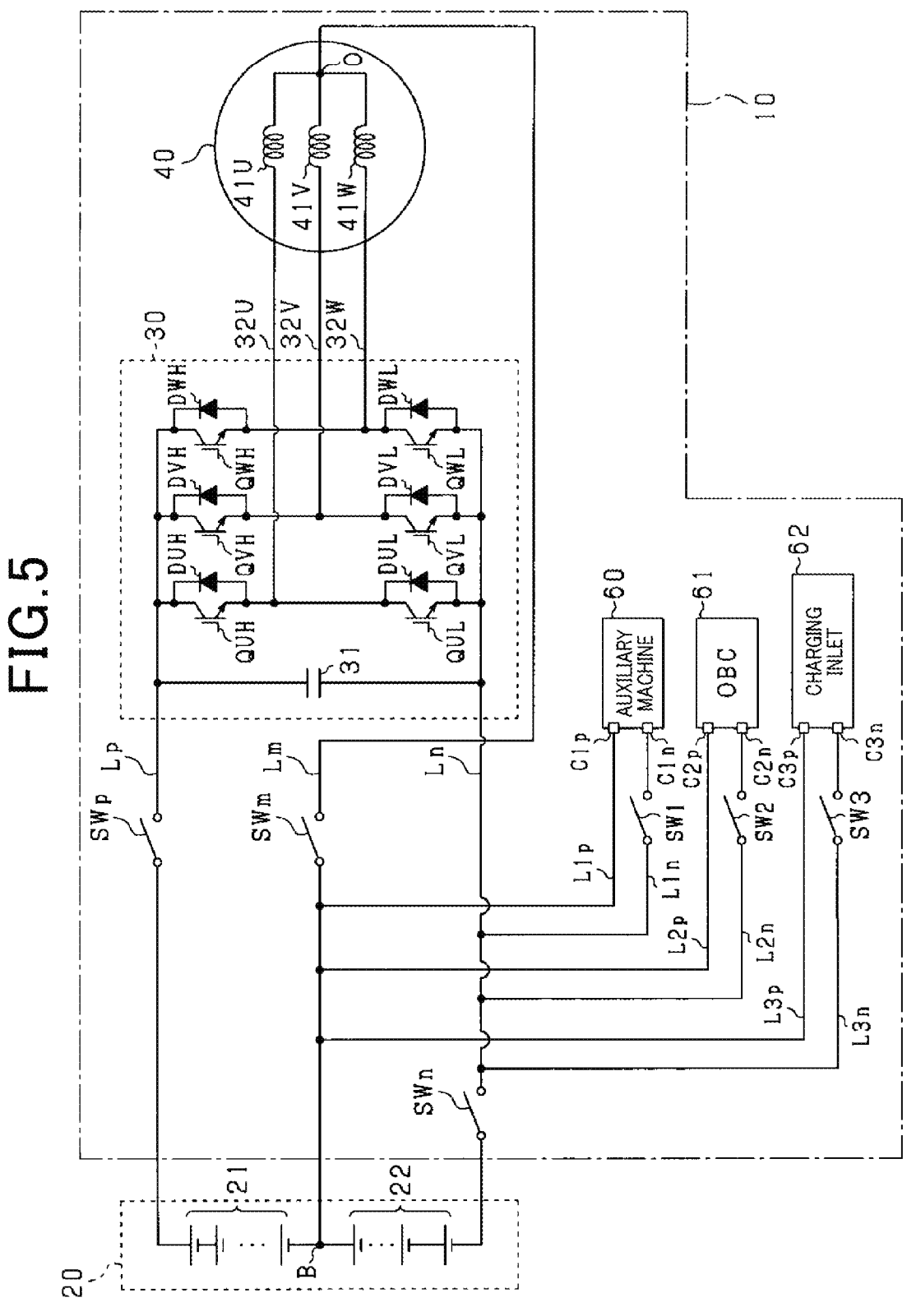
FIG. 5 is a configuration diagram of a power conversion device according to a third embodiment.

A third embodiment will be described below with reference to the drawings mainly concerning a difference from the first embodiment. In the present embodiment, as illustrated in FIG. 5, the negative electrode side switch SWn is provided at a portion on the second storage battery 22 side from a connection point of the low-potential side paths L1$n$, L2$n$ and L3$n$ in the negative electrode side main path Ln.

According to the present embodiment described above, the current capacity of the negative electrode switch SWm can be reduced.

Fourth Embodiment

Figure 6:
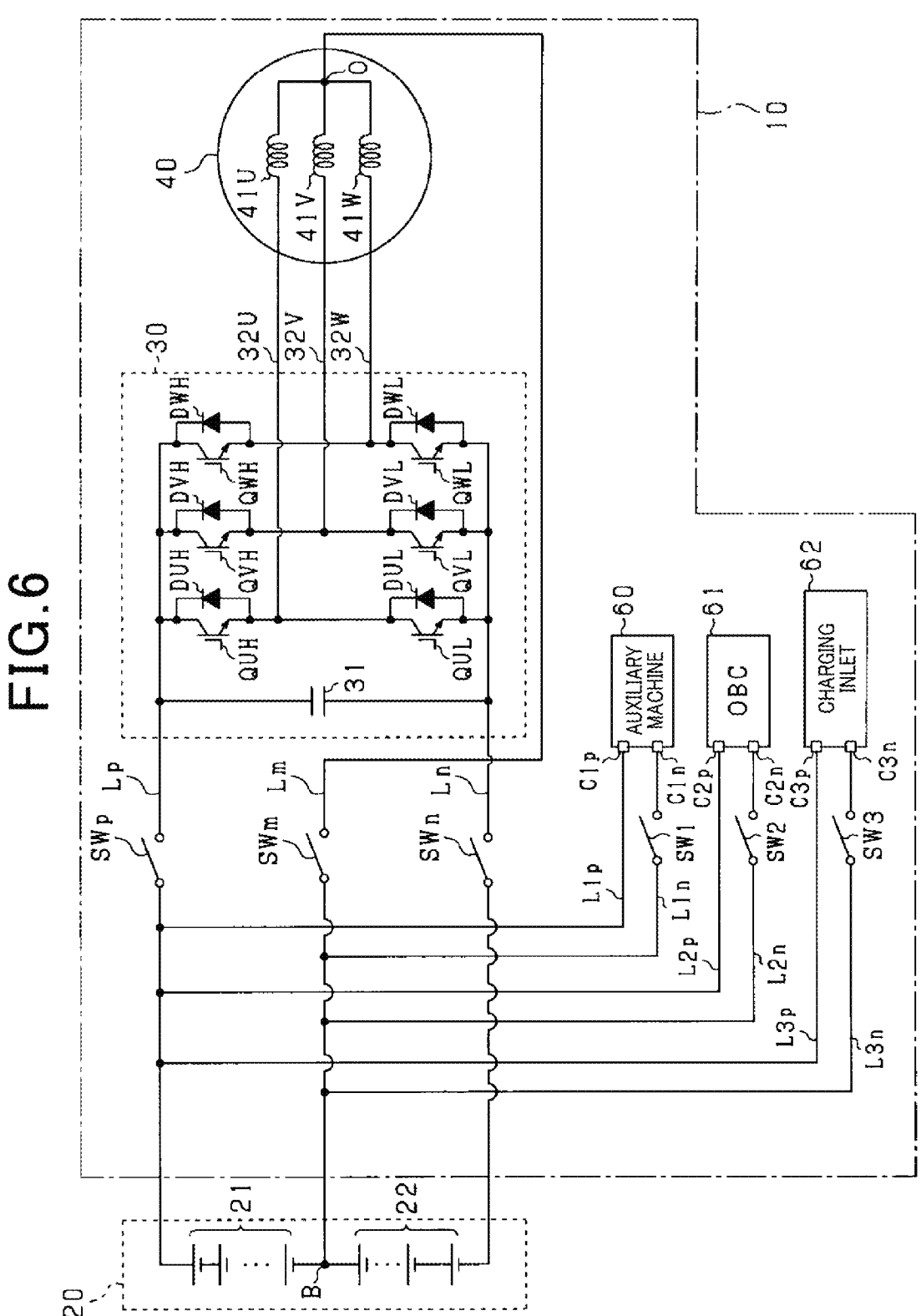
FIG. 6 is a configuration diagram of a power conversion device according to a fourth embodiment.

A fourth embodiment will be described below with reference to the drawings mainly concerning a difference from the first embodiment. In the present embodiment, as illustrated in FIG. 6, the high-potential side paths L1$p$, L2$p$ and L3$p$ are connected to the positive electrode side main path Lp in place of the neutral point path Lm. Further, the low-potential side paths L1$n$, L2$n$ and L3$n$ are connected to the neutral point path Lm in place of the negative electrode side main path Ln. Note that in the present embodiment, the positive electrode side main path Lp corresponds to a "first target path", and the neural point path Lm corresponds to a "second target path".

According to the present embodiment described above, the current capacity of the positive electrode side switch SWp and the neural point switch SWm can be reduce.

Fifth Embodiment

Figure 7:
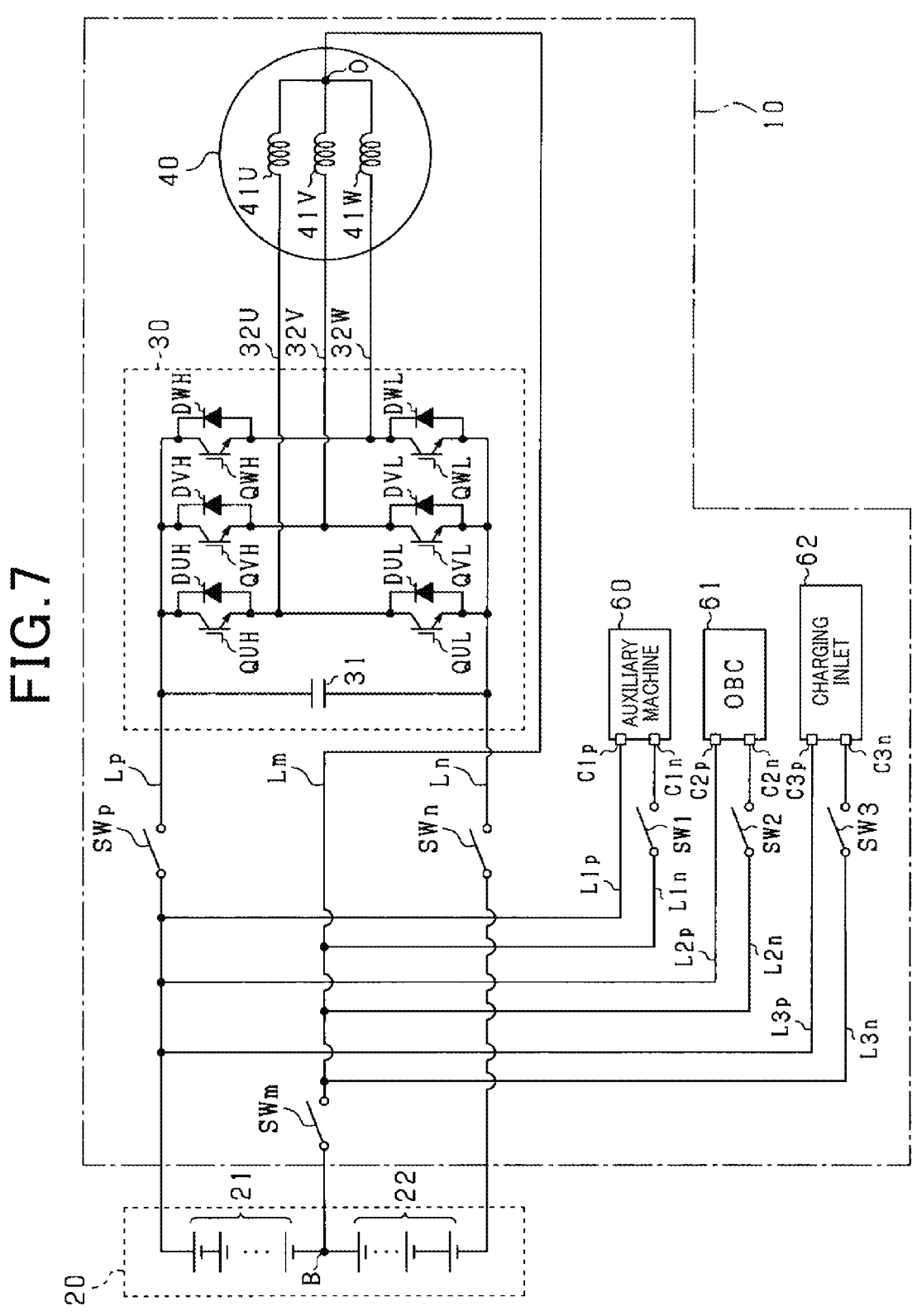
FIG. 7 is a configuration diagram of a power conversion device according to a fifth embodiment.

A fifth embodiment will be described below with reference to the drawings mainly concerning a difference from the fourth embodiment. In the present embodiment, as illustrated in FIG. 7, the neutral point switch SWm is provided at a portion on the intermediate terminal B side from the connection point of the low-potential side paths L1$n$, L2$n$ and L3$n$ in the neural point path Lm.

Processing to be executed by the control device 90 of the present embodiment is similar to the processing described in the second embodiment. In the present embodiment, the first storage battery 21 can be charged via the charger 61 or the charging inlet 62.

According to the present embodiment described above, it is possible to make current capacity of the positive electrode side switch SWp smaller.

Sixth Embodiment

Figure 8:
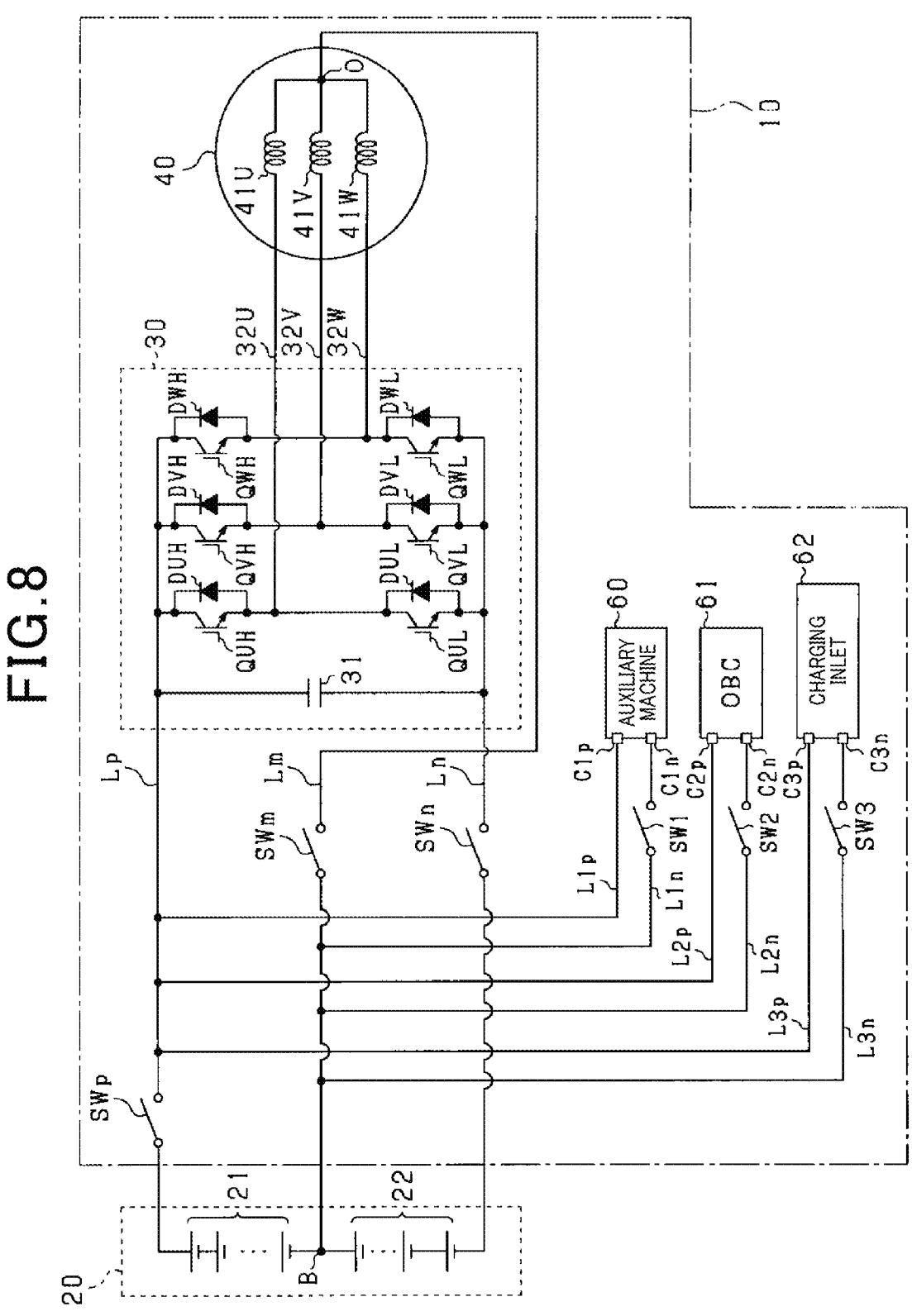
FIG. 8 is a configuration diagram of a power conversion device according to a sixth embodiment.

A sixth embodiment will be described below with reference to the drawings mainly concerning a difference from the fourth embodiment. In the present embodiment, as illustrated in FIG. 8, the positive electrode side switch SWp is provided at a portion on the first storage battery 21 side from the connection point of the high-potential side paths L1$p$, L2$p$ and L3$p$ in the positive electrode side main path Lp.

According to the present embodiment described above, the current capacity of the neutral point switch SWm can be reduce

Seventh Embodiment

Figure 9:
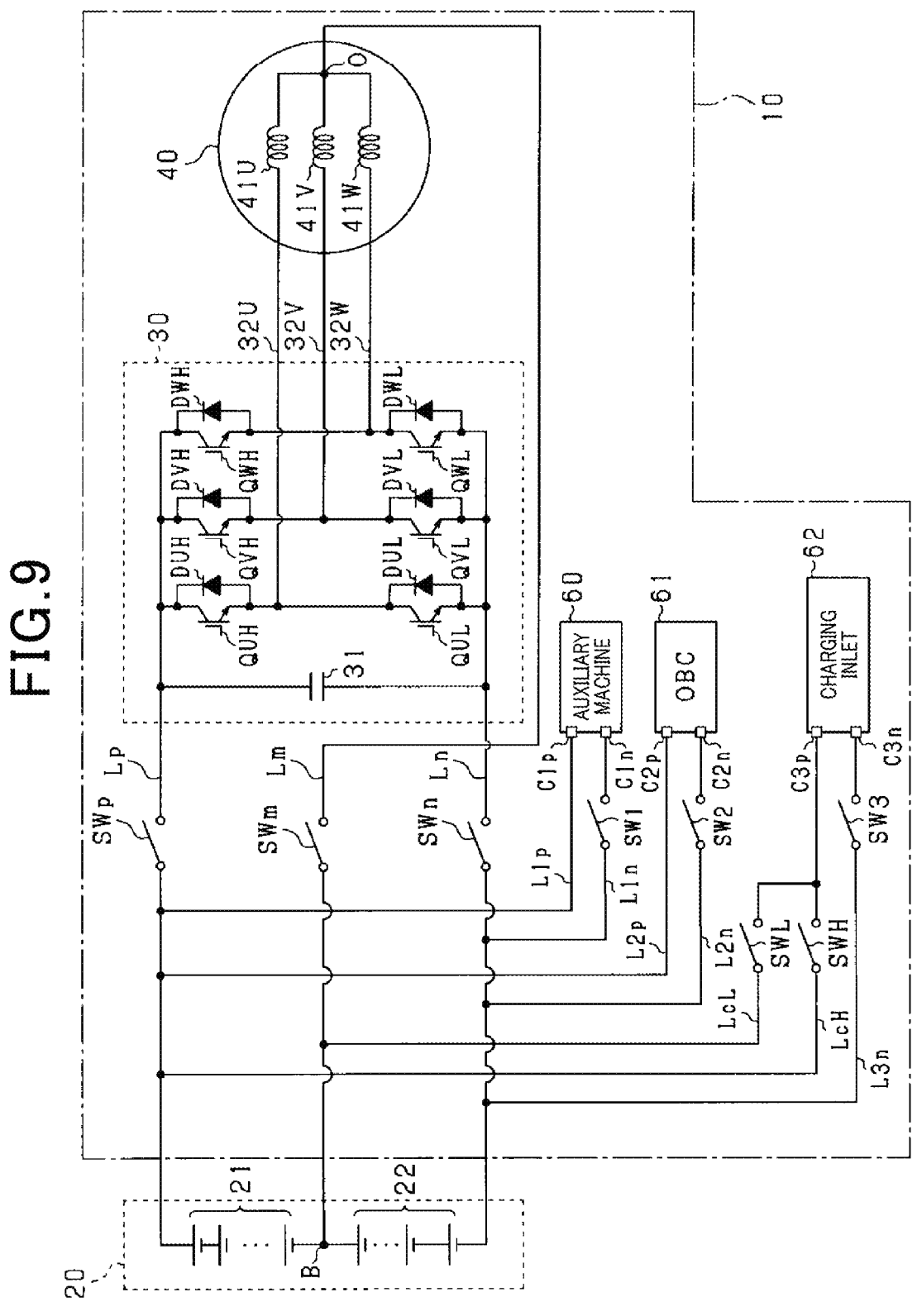
FIG. 9 is a configuration diagram of a power conversion device according to a seventh embodiment.

A seventh embodiment will be described below with reference to the drawings mainly concerning a difference from the first embodiment. In the present embodiment, as illustrated in FIG. 9, connection aspects of electric paths to the respective paths Lp, Lm and Ln are largely changed.

In place of the neutral point path Lm, a portion on the first storage battery 21 side from the positive electrode side switch SWp in the positive electrode side main path Lp is connected to second ends of the first high-potential side path L1$p$ and the second high-potential side path L2$p$. In a state where the first cutoff switch SW1 is turned on, power can be supplied to the auxiliary machine 60 from a serial connection body of the first storage battery 21 and the second storage battery 22. Further, in a state where the second cutoff switch SW2 is turned on, the serial connection body of the first storage battery 21 and the second storage battery 22 is charged by the charger 61. Note that in the present embodiment, the positive electrode side main path Lp corresponds to a "first target path", and the negative electrode side main path Ln corresponds to a "second target path".

A first end of a high voltage charging path LcH is connected to the third positive electrode side terminal C3$p$ of the charging inlet 62. A portion on the first storage battery 21 side from the positive electrode side switch SWp in the positive electrode side main path Lp is connected to a second end of the high voltage charging path LcH. A high-voltage side switch SWH (corresponding to a "cutoff switch") is provided on the high voltage charging path LcH. Note that in the present embodiment, the high voltage charging path LcH and the first to the third high-potential side paths $L1p$ to L3P correspond to a "first connection path".

A first end of a low voltage charging path LcL is connected to a portion on the third positive electrode side terminal C3P from the high-voltage side switch SWH in the high voltage charging path LcH. A portion on the intermediate terminal B side from the neutral point switch SWm in the neutral point path Lm is connected to a second end of the low voltage charging path LcL. A low-voltage side switch SWL is provided on the low voltage charging path LcL.

The charging connector connected to the external charger 72 is connectable to the charging inlet 62. The external charger 72 is one of a fast charger whose charging voltage is a first charging voltage (for example, 400 V), or a super-fast charger whose charging voltage is a second charging voltage (for example, 800 V) higher than the first charging voltage. In a case where it is determined that the external charger 72 is a fast charger, the control device 90 turns off the high-voltage side switch SWH and turns on the low-voltage side switch SWL and the third cutoff switch SW3. By this means, charging current is supplied to the second storage battery 22. On the other hand, in a case where it is determined that the external charger 72 is a super-fast charger, the control device 90 turns off the low-voltage side switch SWL and turns on the high-voltage side switch SWH and the third cutoff switch SW3. By this means, charging current is supplied to the serial connection body of the first storage battery 21 and the second storage battery 22.

According to the present embodiment described above, it is possible to make current capacity of the neutral point switch SWm, the positive electrode side switch SWp and the negative electrode side switch SWn smaller. For comparison, in the present embodiment, the processing indicated in FIG. 2 above can be applied. In this case, in step S11, all or part of the switches SW1, SW3, SWH and SWL may be turned off. Further, in step S18, all or part of the switches SW1, SW2, SWH and SWL may be turned off. Further, in the present embodiment, the processing indicated in FIG. 3 above can be applied. In this case, in step S22, part of and at least one of the first to the third cutoff switches SW1 to SW3 or the high-voltage side switch SWH may be turned off.

Eighth Embodiment

Figure 10:
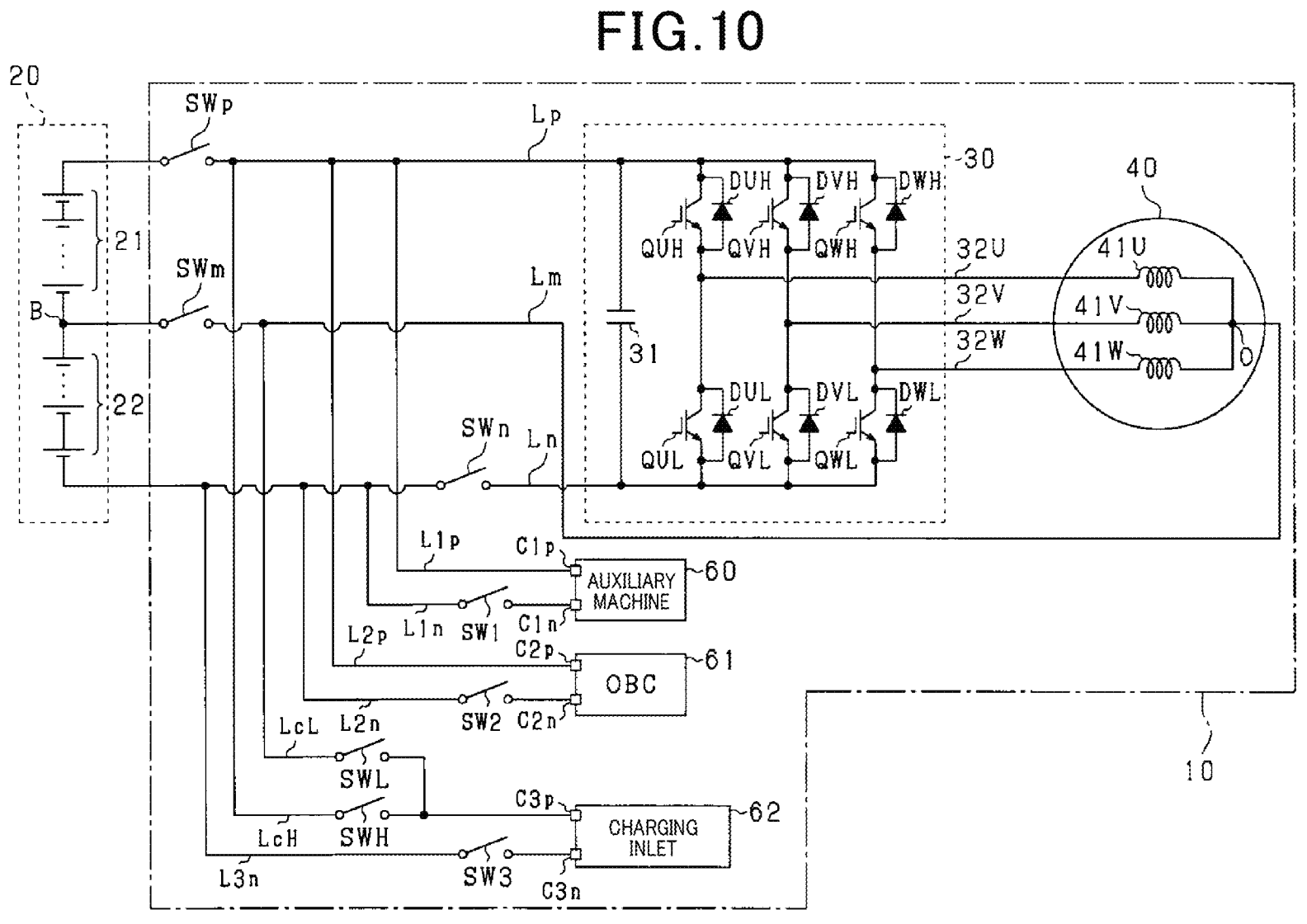

An eighth embodiment will be described below with reference to the drawings mainly concerning a difference from the seventh embodiment. In the present embodiment, as illustrated in FIG. 10, the positive electrode side switch SWp is provided at a portion on the first storage battery 21 side from the connection point of the paths $L1p$, $L2p$ and LcH in the positive electrode side main path Lp.

According to the present embodiment described above, the current capacity of the negative electrode side switch SWn can be reduced.

Ninth Embodiment

Figure 11:
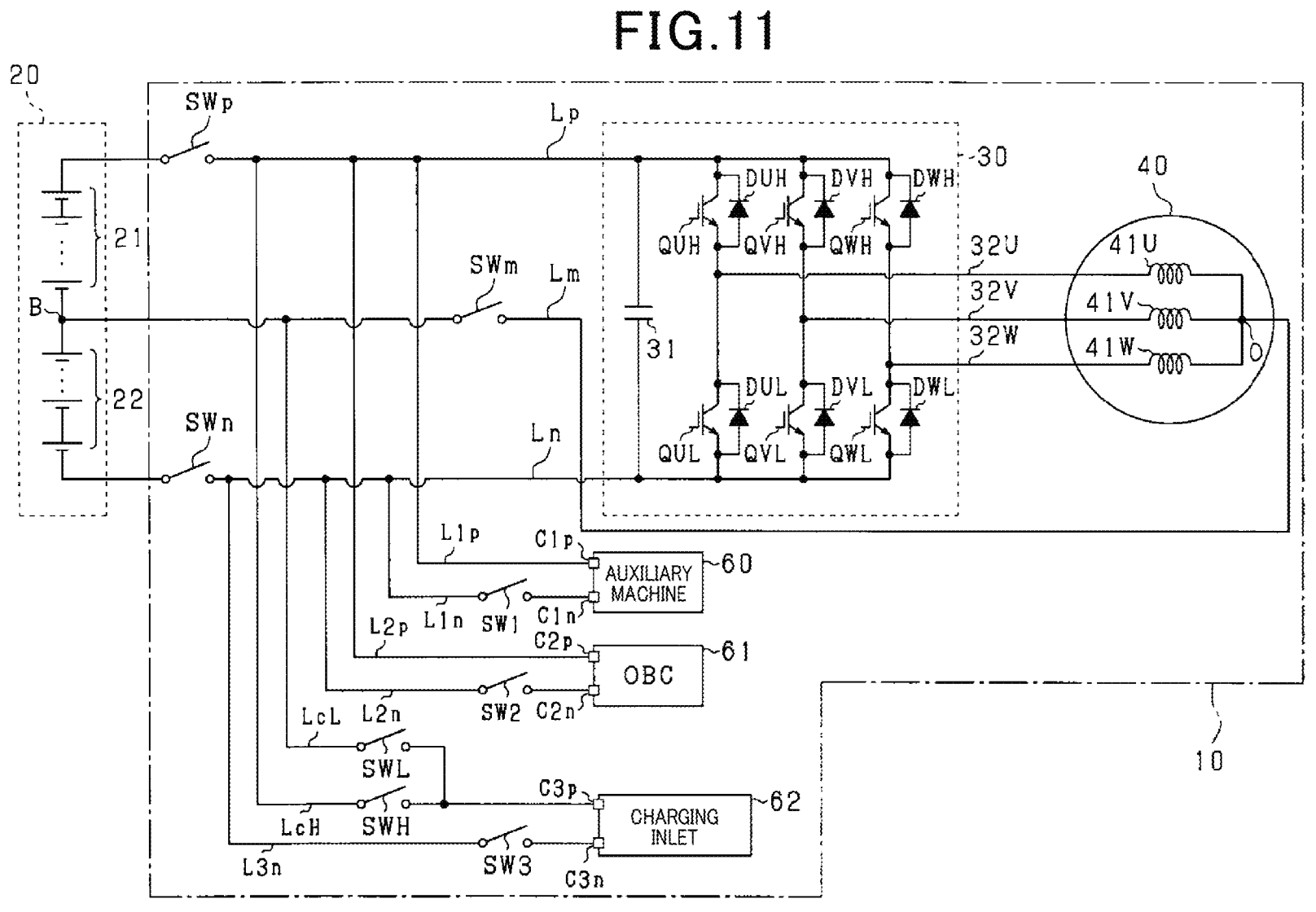

A ninth embodiment will be described below with reference to the drawings mainly concerning a difference from the seventh embodiment. In the present embodiment, as illustrated in FIG. 11, the positive electrode side switch SWp is provided at a portion on the first storage battery 21 side from the connection point of the paths $L1p$, $L2p$ and LcH in the positive electrode side main path Lp. Further, the negative electrode side switch SWn is provided at a portion on the second storage battery 22 side from the connection point of the low-potential side paths $L1n$, $L2n$ and $L3n$ in the negative electrode side path Ln.

According to the present embodiment described above, the current capacity of the neutral point switch SWm can be reduced.

Tenth Embodiment

Figure 12:
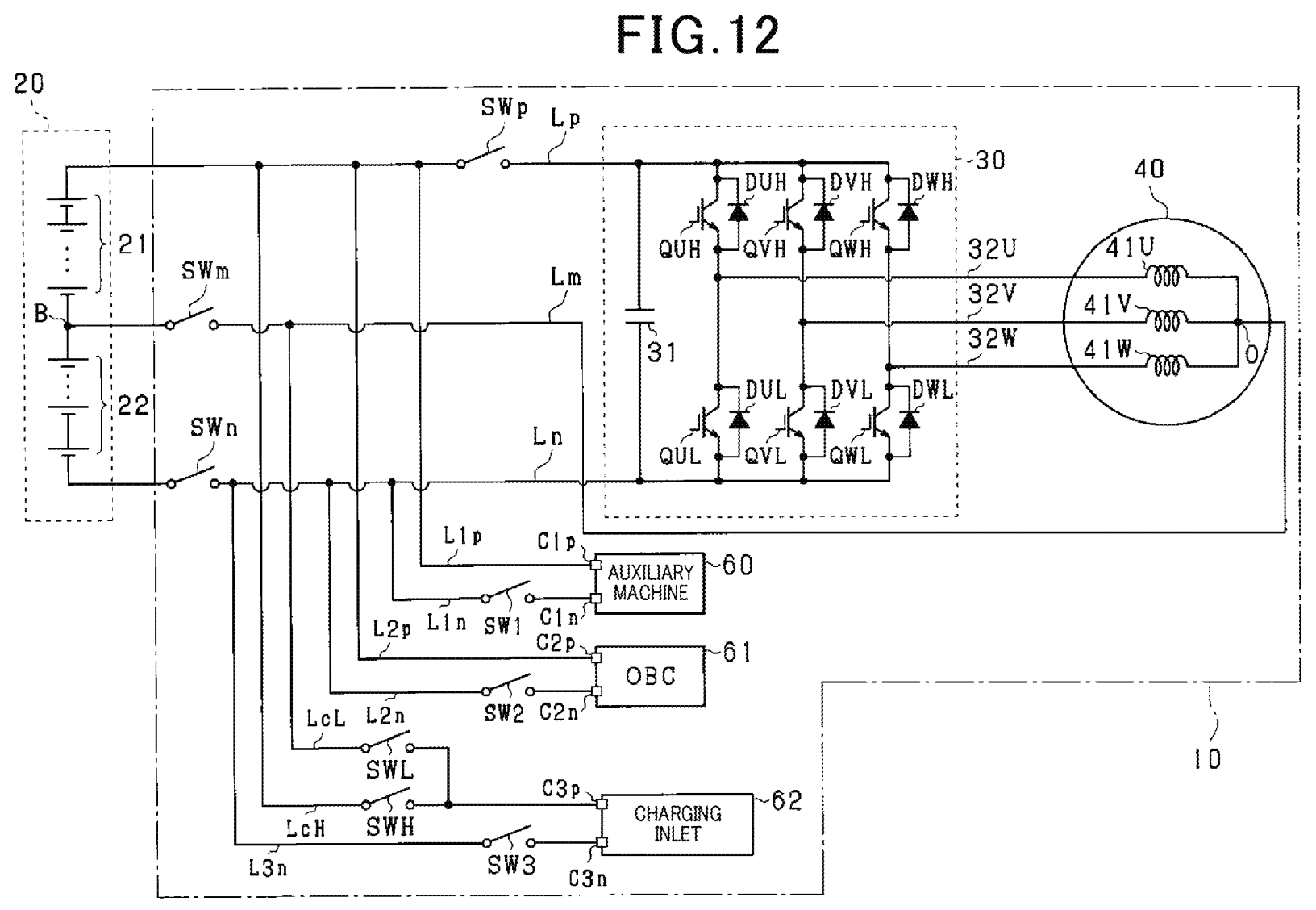

A tenth embodiment will be described below with reference to the drawings mainly concerning a difference from the seventh embodiment. In the present embodiment, as illustrated in FIG. 12, the neutral point switch SWm is provided at a portion on the intermediate terminal B side from a connection point with the low voltage charging path LcL in the neutral point path Lm. Further, the negative electrode side switch SWn is provided at a portion on the second storage battery 22 side from a connection point of the low-potential side paths $L1n$, $L2n$ and $L3n$ in the negative electrode side main path Ln.

According to the present embodiment described above, the current capacity of the positive electrode side switch SWp can be reduced.

OTHER EMBODIMENTS

Note that the above-described embodiments may be implemented while changes are made as follows.

In step S11 in FIG. 2, one of the first cutoff switch SW1 or the third cutoff switch SW3 may be turned off. Further, in step S18, one of the first cutoff switch SW1 or the second cutoff switch SW2 may be turned off.

The first cutoff switch SW1 may be provided only on the first high-potential side path $L1p$ out of the first low-potential side path $L1n$ and the first high-potential side path $L1p$ or may be provided on both the first high-potential side path $L1p$ and the first low-potential side path $L1n$.

The second cutoff switch SW2 may be provided only on the second high-potential side path $L2p$ out of the second low-potential side path $L2n$ and the second high-potential side path $L2p$ or may be provided on both of the second high-potential side path $L2p$ and the second low-potential side path $L2n$.

The third cutoff switch SW3 may be provided only on the third high-potential side path $L3p$ out of the third low-potential side path $L3n$ and the third high-potential side path $L3p$ or may be provided on both of the third high-potential side path $L3p$ and the third low-potential side path $L3n$.

The respective switches SWp, SWm, SWn, SW1 to SW3, SWL and SWH are not limited to relays, and may be, for example, a pair of N channel MOSFETs whose sources are connected to each other or IGBTs.

The upper and lower arm switches that constitute the inverter are not limited to IGBTs and may be, for example, N channel MOSFETs.

The rotating electrical machine and the inverter may have five phases, seven phases, or the like, other than three phases.

The electric storage device may be constituted with, for example, an electric double layer capacitor in place of a storage battery.

A moving body on which the power conversion device is to be mounted is not limited to a vehicle and may be, for example, an aircraft or a ship. For example, in a case where the moving body is an aircraft, rotating electrical machine provided in the aircraft provides a flight power source of the aircraft, and in a case where the moving body is a ship, rotating electrical machine provided in the ship provides a propulsion power source of the ship. Further, a place on which the power conversion device is to be mounted is not limited to a moving body.

While the present disclosure has been described with reference to the examples, it should be understood that the present disclosure is not limited to the examples or structures. The present disclosure incorporates various modifications and modifications within an equivalent range. In addition, various combinations, forms, and other combinations and forms including only one element or more or less elements fall within the scope and the scope of mind of the present disclosure.

What is claimed is:

1. A power conversion device comprising:

an electric storage device including a first electric storage unit and a second electric storage unit connected in series on a negative electrode side of the first electric storage unit;

an inverter including upper and lower arm switches;

rotating electrical machine including a winding wire connected to the inverter;

a positive electrode side main path that connects a high-potential side terminal of the upper arm switch and a positive electrode side of the first electric storage unit;

a negative electrode side main path that connects a low-potential side terminal of the lower arm switch and a negative electrode side of the second electric storage unit;

a neutral point path that connects a battery connection point of a negative electrode side of the first electric storage unit and a positive electrode side of the second electric storage unit, and a neutral point of the winding wire;

switches provided on the positive electrode side main path, the negative electrode side main path and the neutral point path;

electric equipment including a first connection terminal and a second connection terminal;

a first connection path that connects a first target path that is one of the positive electrode side main path, the negative electrode side main path and the neutral point path, and the first connection terminal; and a second connection path that connects a second target path that is one of the positive electrode side main path, the negative electrode side main path and the neutral point path, other than the first target path, and the second connection terminal, wherein at least one of a configuration where the first connection path is connected on the electric storage device side of the switch among the first target path or a configuration where the second connection path is connected on the electric storage device side of the switch in the second target path, is used.

2. The power conversion device according to claim 1, wherein the first target path is the neutral point path, and the second target path is one of the positive electrode side main path and the negative electrode side main path.

3. The power conversion device according to claim 2, wherein the electric equipment includes a charging inlet to which a charging connector of an external charging facility is to be connected, the first connection path to which the first connection terminal of the charging inlet is connected is connected only to the neutral point path among the positive electrode side main path, the negative electrode side main path and the neutral point path, and the second connection path to which the second connection terminal f the charging inlet is connected is connected only to the second target path among the positive electrode side main path, the negative electrode side main path and the neutral point path.

4. The power conversion device according to claim 1, wherein the first connection path is connected on the electric storage device side of the switch in the first target path, and the second connection path is connected on the electric storage device side of the switch in the second target path.

5. The power conversion device according to claim 1, further comprising:

a cutoff switch provided on at least one of the first connection path or the second connection path.

6. The power conversion device according to claim 1, further comprising:

a control unit that applies current between the first electric storage unit and the second electric storage unit via the neutral point path and the neutral point by executing switching control of the upper and lower arm switches.

7. The power conversion device according to claim 1, further comprising:

a control unit that applies current between the first electric storage unit and the second electric storage unit via the neutral point path and the neutral point by executing switching control of the upper and lower arm switches; and a cutoff switch provided on at least one of the first connection path or the second connection path, wherein the control unit turns off the cutoff switch in a case where the switching control is executed.

8. The power conversion device according to claim 7, wherein a plurality of pieces of the electric equipment are provided, and the control unit turns off the cutoff switch corresponding to at least one piece of the electric equipment among the plurality of pieces of electric equipment.

9. The power conversion device according to claim 1, wherein the electric equipment comprises:

a charging inlet to which a charging connector of an external charging facility is connected;

a charger to which an external AC power supply is connected; and auxiliary machine that is driven by power being supplied, and the power conversion device further comprises:

a cutoff switch provided on at least one of the first connection path or the second connection path; and a control unit that turns off at least one of the cutoff switch corresponding to the auxiliary machine or the cutoff switch corresponding to the charger in a case where the electric storage device is charged from the charging facility via the charging inlet, and turns off at least one of the cutoff switch corresponding to the auxiliary machine or the cutoff switch corresponding to the charging inlet in a case where the electric storage device is charged from the AC power supply via the charger.

\* \* \* \* \*